United States Patent [19]
Robbins et al.

[11] Patent Number: 5,358,135
[45] Date of Patent: Oct. 25, 1994

[54] ACCESS DOOR HINGE ATTACHMENT

[75] Inventors: T. Ray Robbins, Raleigh; Paul D. Johnson; Robert W. Sehmer, both of Knightdale, all of N.C.

[73] Assignee: Square D Company, Palatine, Ill.

[21] Appl. No.: 200,837

[22] Filed: Feb. 22, 1994

Related U.S. Application Data

[63] Continuation of Ser. No. 997,475, Dec. 28, 1992, abandoned.

[51] Int. Cl.5 ............................................. B65D 51/04
[52] U.S. Cl. .................................. 220/337; 220/334; 220/326
[58] Field of Search ............... 220/338, 337, 326, 324, 220/344; 215/237; 174/67, 52.1

[56] References Cited

U.S. PATENT DOCUMENTS

| | | | |
|---|---|---|---|
| 3,732,999 | 5/1973 | Rounkles | 220/338 |
| 4,589,228 | 5/1986 | Lachiw et al. | 220/337 |
| 4,730,731 | 3/1988 | Allison | 220/337 |
| 4,776,475 | 10/1988 | La Vange | 215/237 |
| 4,791,244 | 12/1988 | Taybl | 220/337 |
| 4,800,238 | 1/1989 | Gesvent | 174/52.1 |
| 4,979,634 | 12/1990 | Begley | 220/337 |
| 5,100,015 | 3/1992 | Vanderstuyf | 220/326 |
| 5,118,001 | 6/1992 | Gambill | 220/344 |
| 5,131,558 | 7/1992 | Hiromori | 220/326 |

FOREIGN PATENT DOCUMENTS 900552  7/1962  United Kingdom ............... 220/337

Primary Examiner—S. Castellano
Attorney, Agent, or Firm—Michael J. Femal; Larry T. Shrout; Larry I. Golden

[57] ABSTRACT

An enclosure for electrical or electronic devices having components requiring periodic adjustment is provided with an access opening to the adjustments for the components including a hinged, attachable door for closing and sealing the access opening.

15 Claims, 11 Drawing Sheets

1

ACCESS DOOR HINGE ATTACHMENT

This application is a continuation of application Ser. No. 07/997,475, filed on Dec. 28, 1992, now abandoned.

FIELD OF THE INVENTION

The present invention relates to enclosures for electrical or electronic devices, and more specifically to enclosures which contain electrical devices having components requiring periodic adjustments. The enclosure is provided with an access opening through which those adjustments may be made. The enclosure is also provided with an attachable door or cover for sealing the access opening when not in use.

BACKGROUND OF THE INVENTION

It is common for electrical or electronic device enclosures for photoelectric and limit switch sensors and the like to include openings for providing access to adjustable components of the devices contained therein, and a hinged or attachable door, cover, or plug for sealing that access opening. It is also desirable for the attachable door, cover, or plug to be physically attached to the enclosure in such a manner that it can be opened and closed enclosure when it is open. By keeping the door physically attached to the enclosure when it is in the open position the chance of loosing it is greatly diminished. In U.S. Pat. No. 4,800,238, Gesvent discloses a device having a pivotal door attached by a retainer which is ultrasonically welded to the enclosure. The ultrasonic welding of the retainer to the enclosure requires that the door be made from a different material such that it will not also be welded during the process of attachment. Other methods of attaching the door, cover, or plug to the enclosure require additional parts of tools.

SUMMARY OF THE INVENTION

An enclosure for electrical or electronic devices having components requiring periodic adjustment is provided with an access opening for access to the adjustable components and an attachable door for closing and sealing the access opening. A well formed in an outer surface of the enclosure receives one end of the door such that an outer surface of the door and the outer the door such that an outer surface of the door and the outer surface of the enclosure are in a common plane when the door is in its closed position. The door is captively and pivotably attached to the enclosure by a hinge pin integrally formed from one end of the door and selectively received within a hinge pin receiving groove integrally formed in a portion of the well. Attachment of the door to the enclosure is accomplished mechanically by parts integrally formed from the door and enclosure and does not require additional parts, tools, or welding. Other features and advantages of the invention will become apparent to those skilled in the art upon review of the following detailed description, claims and drawings.

Figure 1:
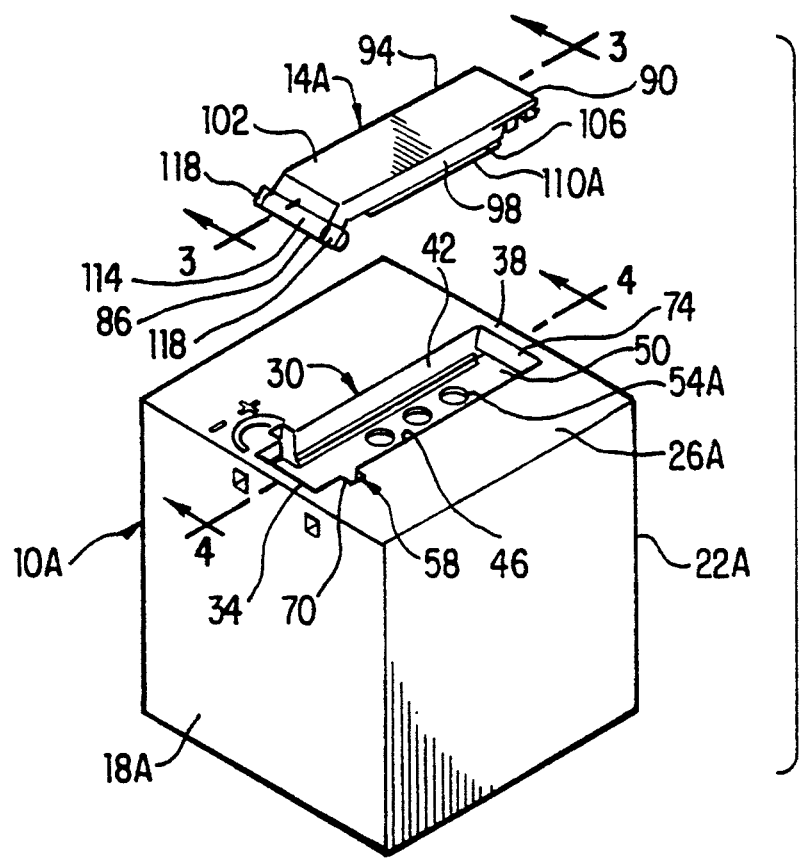
FIG. 1 is an isometric of an enclosure with the access door removed and above the well.

Before the invention is explained in detail, it is to be understood that the invention is not limited in its application to the details of construction and description illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

In FIG. 1 reference numeral 10A generally illustrates an enclosure for electrical or electronic devices that may require periodic adjustments of some components for proper operation. The enclosure 10A is provided with an attachable access door 14A which may be opened for access to the adjustable components enclosed within the enclosure 10A, and closed to seal the enclosure 10A against the ingress of dust and liquids. The enclosure 10A may also include other sealable apertures which are not intended to be opened during normal use.

The enclosure 10A is preferably cube like in shape having a hollow interior portion for receiving the electrical or electronic components and any related circuit boards.

The enclosure 10A has a first side 18A, a second side 22A which is generally parallel to and spaced apart from the first side 18A, and a top 26A. The top 26A is generally flat, and perpendicular to and intermediate the first and second sides 18A and 22A, respectively. The top 26A includes a portion defining a well 30 which extends downwardly from the top 26A and is generally rectangular in shape. The well 30 includes a first end 34, a second end 38, a first side wall 42, a second side wall 46, and a bottom 50. The bottom 50 is generally flat and parallel to the top 26A. The bottom 50 includes one or more access holes 54A which pass through the bottom 50 permitting access to the adjustable components contained within the enclosure 10A. The first and second side walls, 42 and 46 respectively, are spaced apart by the bottom 50, and are perpendicular to and intermediate the bottom 50 and the top 26A of the enclosure 10A. Each of the first and second side walls, 42 and 46, respectively, includes a portion defining a retaining groove 58 near the first end 34 of the well 30. The retaining grooves 58 are generally rectangular in cross-section and are disposed in the side walls such that they have one side open to the well 30. The retaining groove 58 in the first side wall 42 is directly opposite the retaining groove 58 in the second side wall 46. Each retaining groove 58 has a first leg 62 and a second leg 66. The legs 62 and 66 are connected at a common end 68 and are generally perpendicular to one another such that retaining groove 58 is generally L-shaped. The first leg 62 is disposed in the side wall such that it extends upwardly from the common end 68 and generally perpendicularly to the bottom 50 terminating at a distal end 70 which is coincident with the top 26A of the enclosure 10A. The second leg 66 is disposed in the side wall such that it extends from the common end 68 towards the first end 34 of the well 30 in a plane generally parallel to the bottom 50. The second leg 66 terminates at its intersection with the first side 18A of the enclosure 10A. The depth of both the first and second legs 62 and 66 respectively of the L-shaped retaining groove 58 are the same. The width of the open side of the first leg 62 is slightly smaller than the width of the open side of the second leg 66. The first leg 62 also includes an alignment surface 72 which is formed by one of the sides of the groove 58 which is generally perpendicular to the side wall of the well 30.

The second end 38 of the well 30 includes an inclined surface 74 and a passage 78 below the inclined surface 74. The passage 78 is generally rectangular in shape, includes a portion of the bottom 50, and a top 82, spaced apart from and parallel to the bottom 50. The passage 78 connects the second end 38 of the well 30 with the second side 22A of the enclosure 10A. The inclined surface 74 angles downward from the top 26A toward the first end 34 of the well 30 and terminates at its intersection with the top 82 of the passage 78.

The door 14A includes a hinging end 86, a latching end 90, a first side 94, a second side 98 parallel to and spaced apart from the first side 94, a top 102, and a bottom 106 generally parallel to and spaced apart from the top 102. The first and second sides, 94 and 98 respectively, are generally perpendicular to and intermediate the top 102 and the bottom 106. A compressible sealing means 110A such as a rubber gasket may be fixedly attached to the bottom 106 of the door 14A by any suitable means. When the door 14A is in the closed position the sealing means 110A is compressed between the bottom 106 of the door 14A and the bottom 50 of the well 30 to prevent liquids or dust from entering the access holes 54A. The hinging end 86 of the door 14A includes an integrally formed hinge pin 114. The hinge pin 114 is generally cylindrical in shape having a full circular diameter and extends outwardly from and perpendicular to each of the first and second sides 94 and 98 respectively. The length of the outwardly extended portion the hinge pin 114 is slightly less than the depth of the L-shaped retaining groove 58. Each of the outwardly extending portions has a flat chordal surface 118. The flat chordal surface 118 reduces the cross-sectional dimension of the full circular diameter of the hinge pin 114 such that it may be selectively and slidably received within the first leg 62 of the L-shaped retaining groove 58. The first leg 62 is sized to receive only the reduced cross-sectional dimension of the extended portion of the hinge pin 114. The second leg 66 is sized to slidably receive the full circular diameter of the hinge pin 114.

Figure 2:
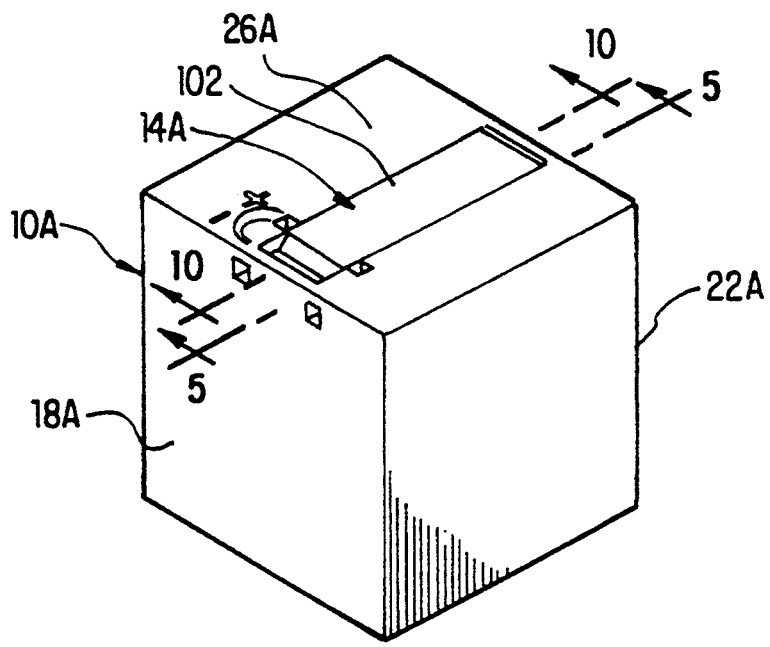
FIG. 2 is an isometric of an enclosure with the access door installed and in the closed position.
Figure 9:
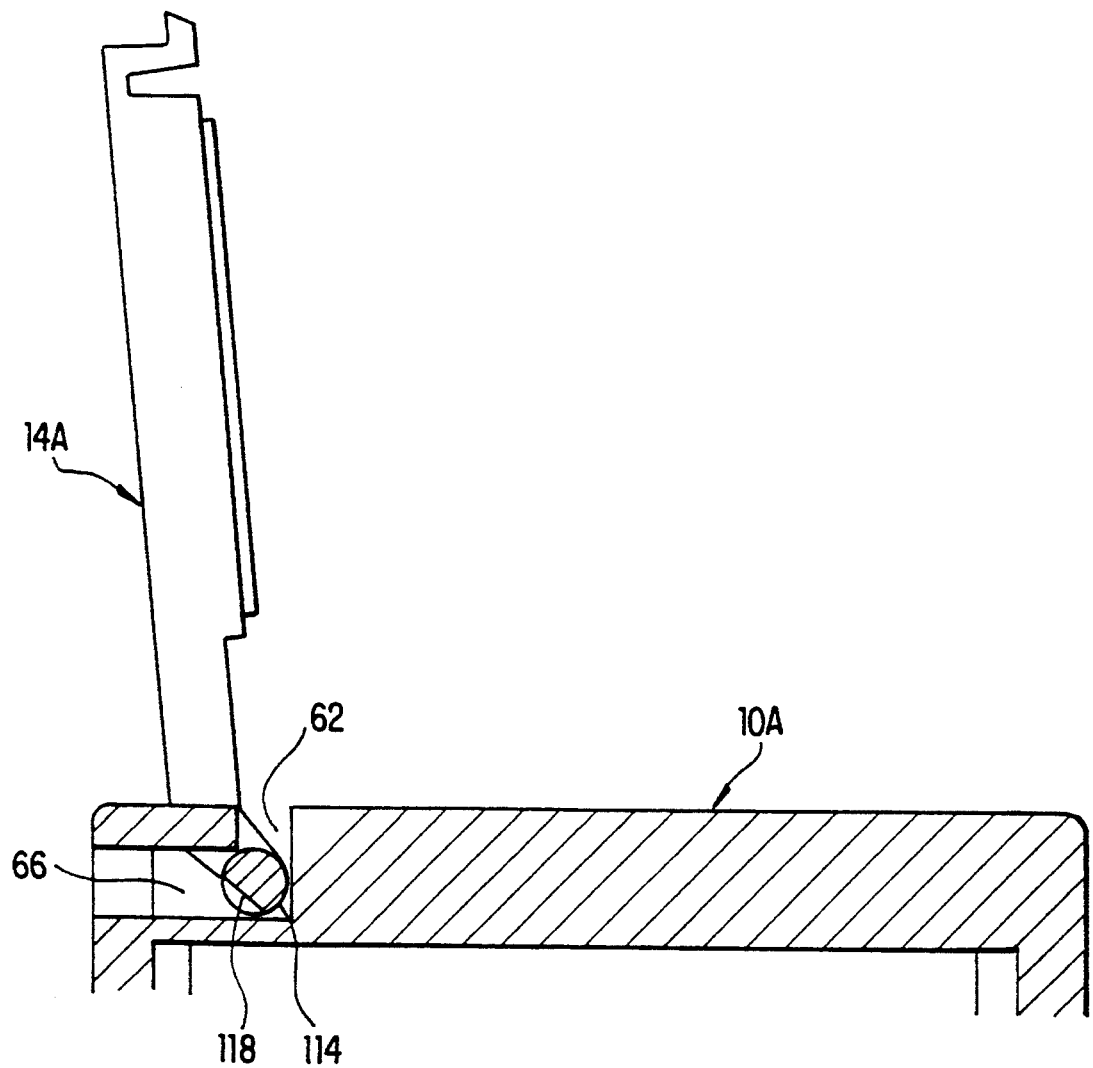
FIG. 9 is a cross-sectional view taken along line 5—5 of FIG. 2 showing the access door in the fully open position.
Figure 10:
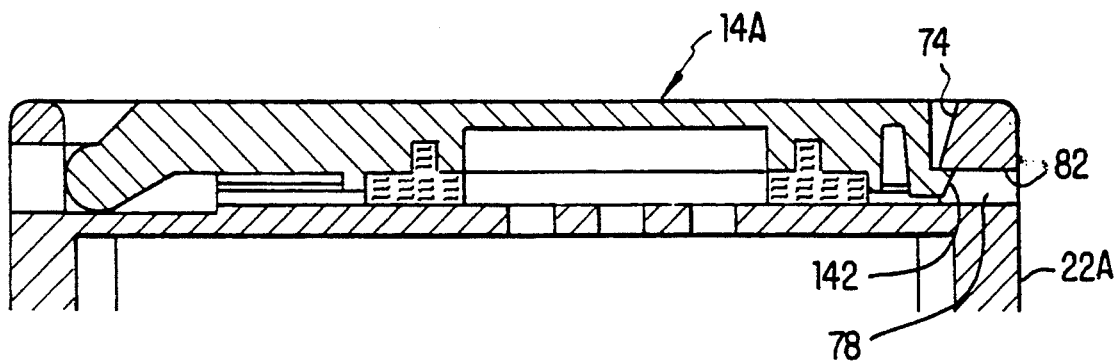
FIG. 10 is a cross-sectional view taken along line 10—10 of FIG. 2 showing the access door in the closed position, the sealing gasket, and the latching mechanism.

The door 14A is attached to the enclosure 10A by inserting the hinge pin 114 into the distal end 70 of the first leg 62 of the L-shaped retaining grove 58. The hinge pin 114 is only permitted to enter first leg 62 of the L-shaped retaining groove 58 when the flat chordal surface 118 is placed against the alignment surface 72 of the first leg 62. When the hinge pin 114 has been fully inserted to the bottom of the first leg 62, its full diameter may then be slidably received within the second leg 66 of the L-shaped retaining groove 58. While in the second leg 66 the hinge pin 114 may slide and rotate freely from a fully closed position shown in FIG. 2 to a fully open position shown in FIG. 9. As shown in FIG. 9, the position of the flat chordal surface 118 on the hinge pin 114 is selected such that the hinge pin 114 can not be removed from the second leg 66 of the L-shaped retaining groove 58 when door 14A has been rotated to its fully open position. The door 14A must be moved to a selected position in order to be detached from the enclosure 10A.

A latching member 122 is flexibly and integrally connected to the latching end 90 of the door 14A by a flexible bridge 126 formed from an extension of the top 102. The latching member is generally parallel to and spaced apart from the latching end 90 of the door 14A. The flexible bridge 126 has a rectangular cross-section significantly less than the cross-section of the door 14A thereby permitting it to flex slightly when a force is applied. The latching member 122 includes a first leg 130 extending downward from and generally perpendicular to the bridge 126 and terminating at a distal end 134.

Figure 3:
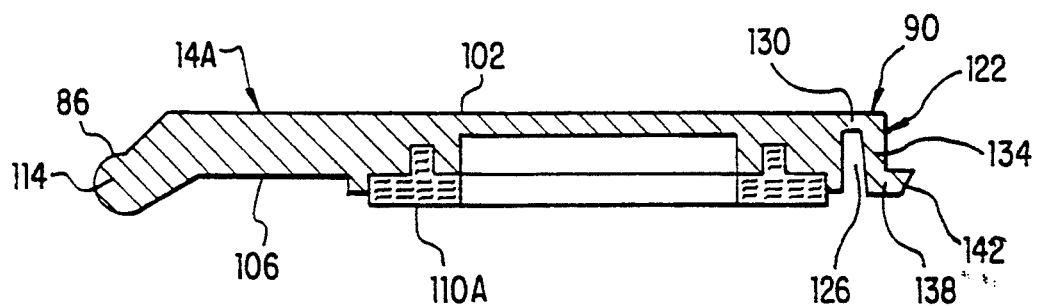
FIG. 3 is a cross-sectional view of the access door taken along line 3—3 of FIG. 1.
Figure 4:
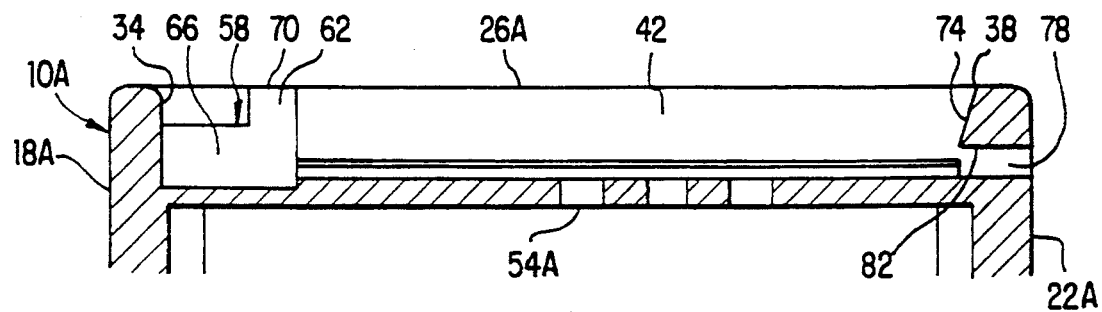
FIG. 4 is a cross-sectional view of the enclosure taken along line 4—4 of FIG. 1.
Figure 5:
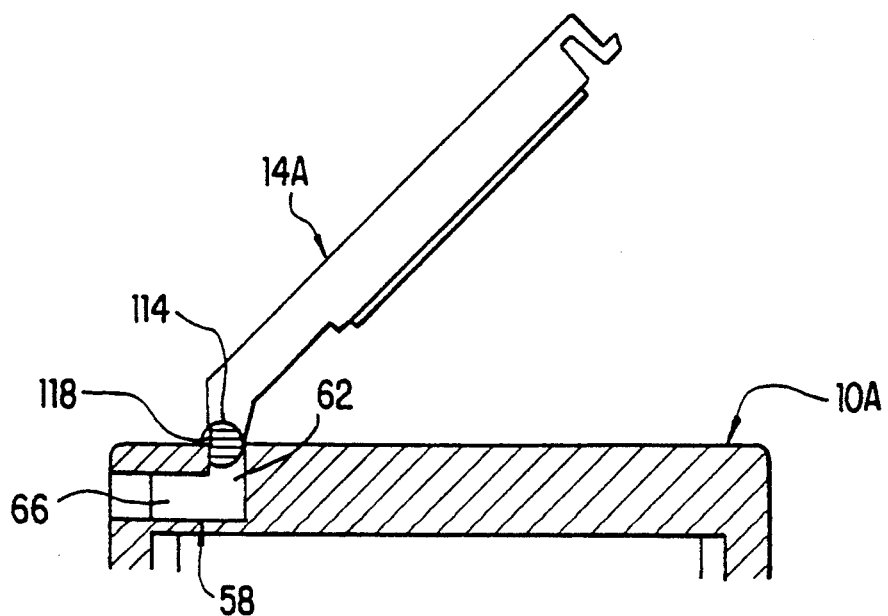
FIG. 5 is a cross-sectional view of the enclosure taken along line 5—5 of FIG. 2 showing the access door hinge pin being initially inserted into the first leg of the L-shaped retaining slot.
Figure 6:
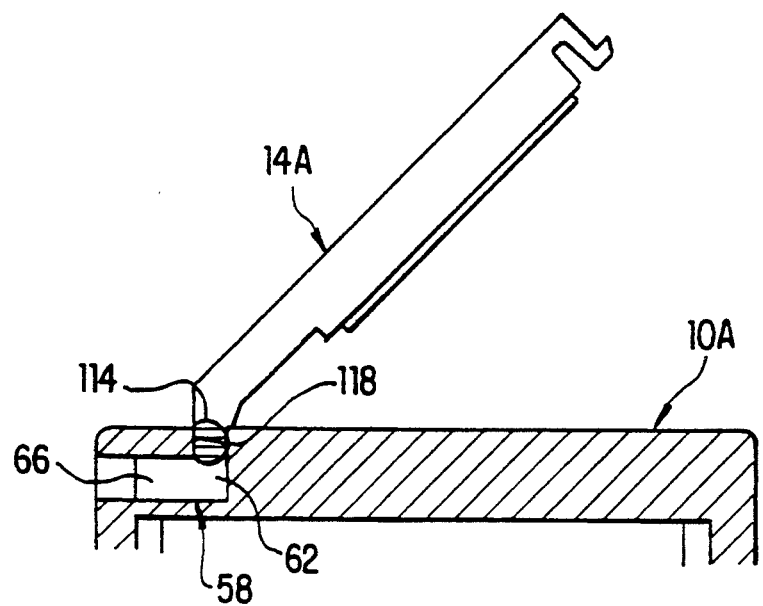
FIG. 6 is a cross-sectional view of the enclosure taken along line 5—5 of FIG. 2 showing the access door hinge pin half way down the first leg of the L-shaped retaining slot.
Figure 7:
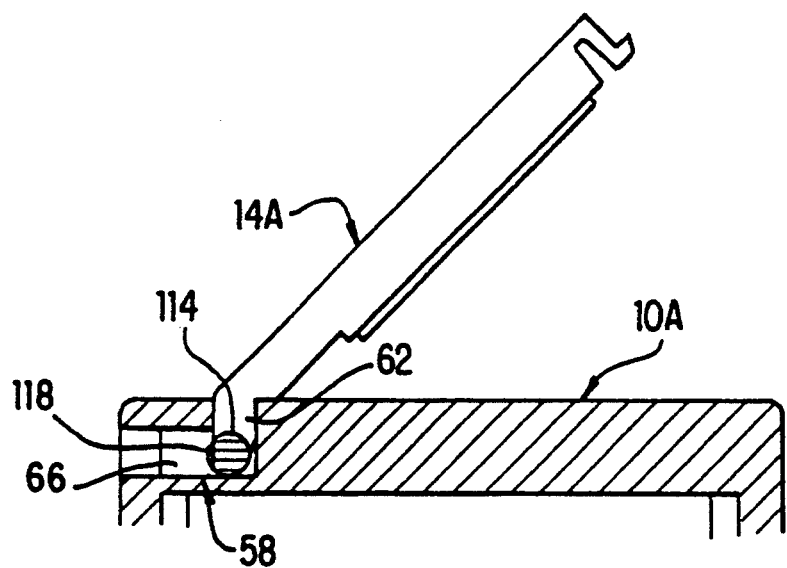
FIG. 7 is a cross-sectional view of the enclosure taken along line 5—5 of FIG. 2 showing the access door hinge pin at the bottom of the first leg of the L-shaped retaining slot.
Figure 8:
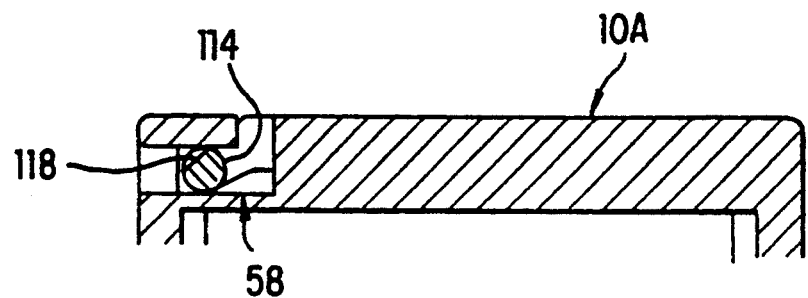
FIG. 8 is a cross-sectional view of the enclosure taken along line 5—5 of FIG. 2 showing the access door hinge pin fully inserted in the second leg of the L-shaped retaining slot and the door in the closed position.

In FIGS. 3 and 4, a second leg 138 is integrally connected to the distal end 134 of the first leg 130, and extends outwardly from and perpendicular to the first leg 130. The second leg 138 is generally angular in cross-section, having an inclined surface 142 angled upward from the bottom 106 and away from the latching end 90 of the door 14A. The triangular cross-section is preferred, however a rounded or square cross-section would be acceptable. As the door 14A is rotated to the closed position, the inclined surface 142 of the latching member 122 slidingly engages the inclined surface 74 at the second end 38 of the well 30 causing the latching member 122 to flex inwardly as the two inclined surfaces slide past one another. After the two inclined surfaces have passed one another the latching member 122 will return to its normal position causing the second leg 138 of the latching member 122 to engage the top 82 of the passage 78 holding the door 14A in the closed position. The space between the latching end 90 of the door 14A and the inclined surface 74 of the well 30 permits a tool, such as a small screwdriver, to be used as a lever for urging the latch member 122 inward thereby releasing it from the top of the passage and permitting the door 14A to be opened.

Figure 11:
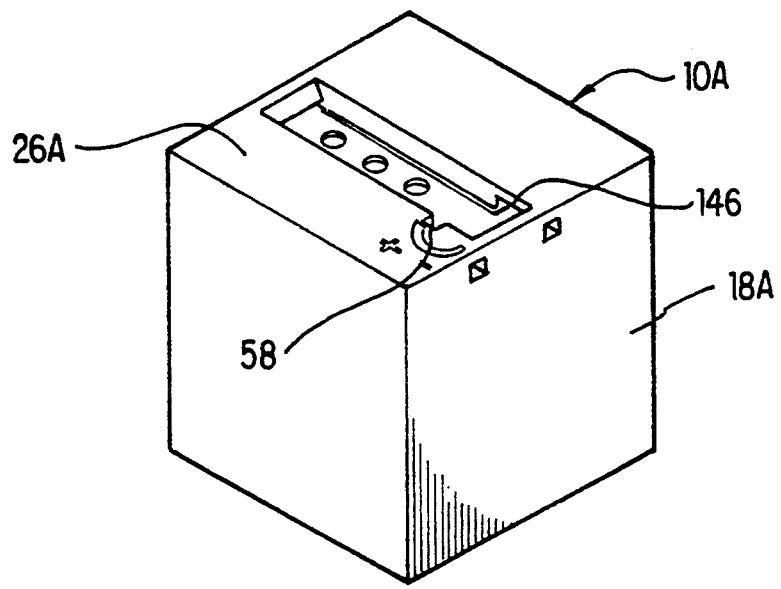
FIG. 11 is an isometric view of a variation of the preferred embodiment having one L-shaped retaining slot and one straight retaining slot.
Figure 12:
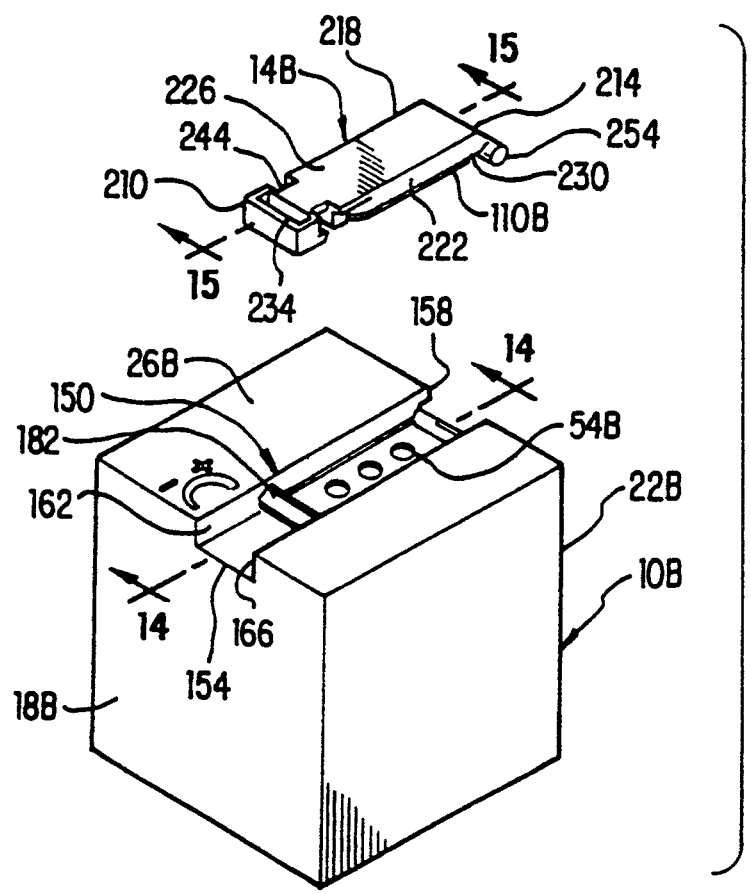
FIG. 12 is an isometric view of the second embodiment of the invention showing the first side of the enclosure with the door remove and above the enclosure.
Figure 13:
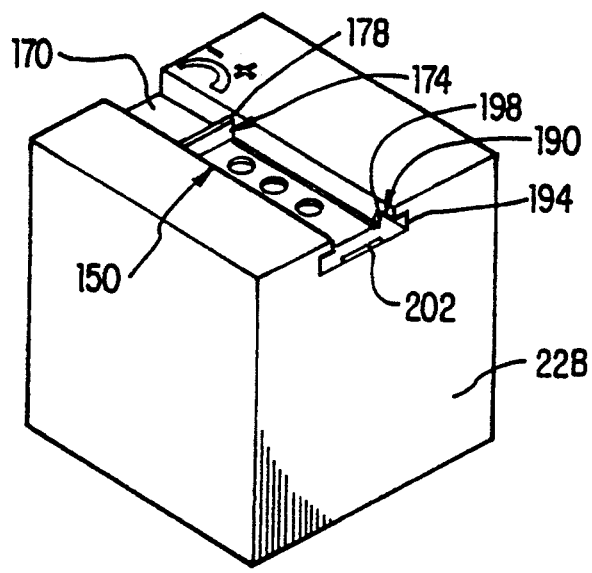
FIG. 13 is an isometric view of the second embodiment showing the second side with the door remove.

In a variation of the first embodiment shown in FIG. 11 only one L shaped retaining groove 58 is employed. A straight retaining groove 146 generally equivalent to the second leg 66 of the L-shaped retaining groove 58 is used in the opposite side wall of the well 30. One hinge pin 114 of the door 14A is inserted into the straight retaining groove 146 while the other hinge pin 114 is slidably inserted into the first leg 62 of the L-shaped retaining groove 58 in the opposite side wall. Other elements and operations of the access door 14A and the enclosure 10A are the same as described in the first embodiment above.

A second embodiment of the invention is shown in FIGS. 12–16 and described below. The electronic or electrical component enclosure is generally indicated by reference numeral 10B and the access door is generally indicate by numeral 14B. The enclosure is preferably cube like having a first side 18B, a second side 22B parallel to and space apart from the first side 18B, and a flat top 26B perpendicular to and intermediate the first and second sides 18B and 22B, respectively. The top 26B includes a door receiving slot 150 for receiving the access door 14B. The receiving slot 150 extends downwardly from the top 26B, is generally rectangular in shape and includes a first end 154 coincident with the first side 18B, a second end 158 coincident with the second side 22B, a first side wall 162, a second side wall 166 spaced apart from and parallel to the first side wall 162, and a bottom 170 intermediate the first and second side walls 162 and 166, respectively. The bottom 170 has at least one access hole 54B and a latch hook 174. The latch hook 174 extends upwardly from and perpendicular to the bottom 170 near the first end 154 of the receiving slot 150. The latch hook 174 has a distal end 178 which includes a beveled surface 182 slanting downward toward the bottom 170 and the first end 154 of the receiving slot 150. The beveled surface 182 ends at an undercut 186 which also faces the first end 154 of the receiving slot 150. Each of the first and second side walls 162 and 166, respectively, includes a hinge pin slot 190 at the second end 158 of the receiving slot 150. Each hinge pin slot 190 includes a first end 194 which coincides with the second side 22B of the enclosure 10B and a second end 198 which is semicircular in shape. The hinge pin slot 190 in the first side wall 162 is directly opposite the hinge pin slot 190 in the second side wall 166. A retaining ridge 202, generally right triangular in cross-section, protrudes upward from the bottom 170 at the second end 158 of the receiving slot 150. The hypothenuse of the triangular shaped retaining ridge 202 forms a ramp 206 sloping gently upward and inward from the intersection of the bottom 170 with the second side 22B of the enclosure 10B.

Figure 15:
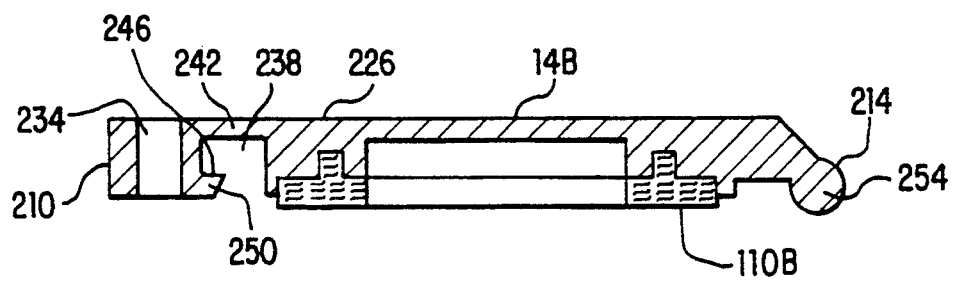
FIG. 15 is a cross-sectional view taken along line 15—15 of FIG. 12 showing the door of the second embodiment.
Figure 16:
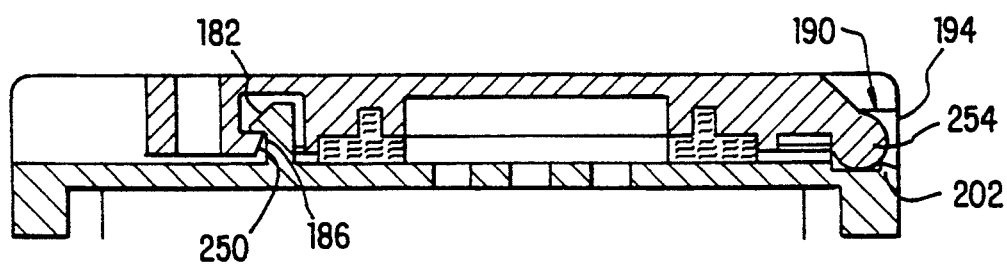
FIG. 16 is a cross-sectional view taken along line 14—14 of FIG. 12 showing the door in the closed position, the sealing means, and the latching mechanism of the second embodiment.

The access door 14B as shown in FIG. 15, is generally rectangular in shape and includes a latching end 210, a hinging end 214, a first side 218, a second side 222, a top 226, and a bottom 230. A compressible sealing means 110B may be fixedly attached to the bottom 230 of the door 14B by any suitable means. The latching end 210 includes a rectangular passage 234 connecting the top 226 with the bottom 230. A generally square shaped groove 238 extends upward from the bottom 230 immediately adjacent to the passage 234 connecting the first and second sides 218 and 222, respectively. The portion of the top 226 remaining above the groove 238 forms a flexible bridge 242. The flexibility of the bridge 242 is increased by a notch 244 in each of the first and second sides 218 and 222, respectively. The notches 244 coincide with the groove 238. A portion of the bottom 230 immediately adjacent to the passage 234 forms a lip 246 which extends into the groove 238. The lip 246 has a beveled end 250. At the hinging end 214 of the door 14B is a hinge pin 254, generally cylindrical in shape and an integral part of the door 14B. The hinge pin 254 extends outwardly from and perpendicularly to each of the first and second sides 218 and 222, respectively, of the door 14B.

Figure 14:
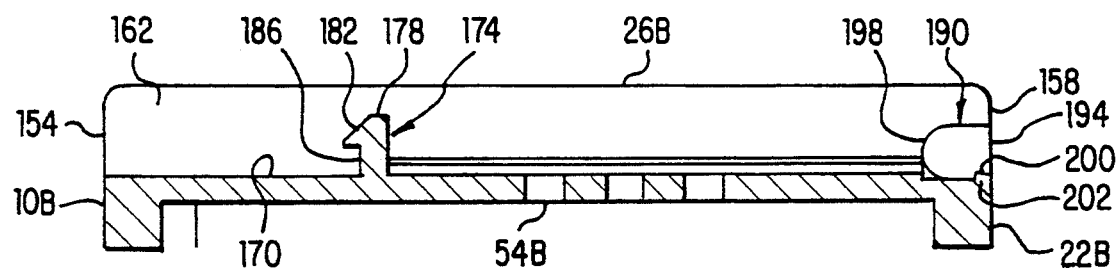
FIG. 14 is a cross-sectional view taken along line 14—14 of FIG. 12 showing the slot for receiving the door in the second embodiment.

To attach the door 14B to the enclosure 10B the extending ends of the hinge pin 254 are slidably inserted into the first end 194 of the hinge pin slots 190. As the hinge pin 254 is inserted into the hinge pin slots 190 it must be urged up and over the ramp 206 of the retaining ridge 202. After the hinge pin 254 passes over the end of the ramp 206 the door 14B is captivated to the enclosure 10B by the extending ends of the hinge pin 254 in the second ends 198 of the hinge pin slots 190 and retaining ridge 202. In this position the door 14B is permitted to pivot on the hinge pin 254 from an opened position to a closed position. As the door 14B approaches the closed position the beveled end 250 of the lip 246 slidably engages the beveled surface 182 of the latch hook 174 causing the bridge 242 to flex. The flexing of the bridge 242 allows the lip 246 to slidably pass by the beveled surface 182 of the latch hook 174 and engage the undercut 186 locking the door 14B in the closed position as the bridge 242 returns to its normal position. In the closed position as shown in FIG. 14, the sealing means 110B is compressed between the bottom 230 of the door 14B and the bottom 170 of the receiving slot 150 to seal the access opening 54B.

To open the access door 14B a lever means such as a screwdriver is inserted into the passage 234 at the latching end 210 of the door 14B. A light force applied to the lever in the direction of the second end 214 of the door 14B causes the bridge 242 to flex thereby releasing the lip 246 from the undercut 186 and allowing the door 14B to be opened for access to the access hole 54B.

A third embodiment of the invention is shown in FIGS. 17–21 and described below. The electronic or electrical components enclosure is generally indicated by reference numeral 10C and the access door is generally indicate by numeral 14C. The enclosure is preferably cube like having a first side 18C, a second side 22C parallel to and space apart from the first side 18C, and a flat top 26C perpendicular to and intermediate the first and second sides 18C and 22C, respectively. The top 26C includes a door receiving slot 258 for receiving the access door 14C. The door receiving slot 258 extends downwardly from the top 26C, is generally rectangular in shape and includes a first end 262 coincident with the first side 18C, a second end 266 coincident with the second side 22C, a first side wall 270, a second side wall 274 spaced apart from and parallel to the first side wall 270, and a bottom 278 intermediate the first and second side walls 270 and 274, respectively. The bottom 278 has at least one access hole 54C for providing access to the enclosed electrical or electronic components. Each of the first and second side walls 270 and 274, respectively, includes a hinge pin slot 282, generally rectangular in shape, extending inward from the first end 262 of the door receiving slot 258, and having one side in common with the bottom 278. Each hinge pin slot 282 includes a first end 286 which coincides with the first side 18C of the enclosure 10C and a second end 290 spaced inwardly from the first end 286. The hinge pin slot 282 in the first side wall 270 is directly opposite the hinge pin slot 282 in the second side wall 274. A first retaining ridge 294 and a second retaining ridge 298, each parallel to and spaced apart from the other, project upward from the bottom 278 between the first and second ends 286 and 290, respectively, of the hinge pin slots 282. The first and second retaining ridges 294 and 298, respectively, lie perpendicular to the hinge pin slots 282. Each of the first and second side walls 270 and 274, respectively, also includes a locking groove 302 at the second end 266 of the door receiving slot 258. Each locking groove 302 includes a first end 306 which coincides with the second side 22C of the enclosure 10C, and a second end 310 spaced inwardly from the first end 306.

Figure 17:
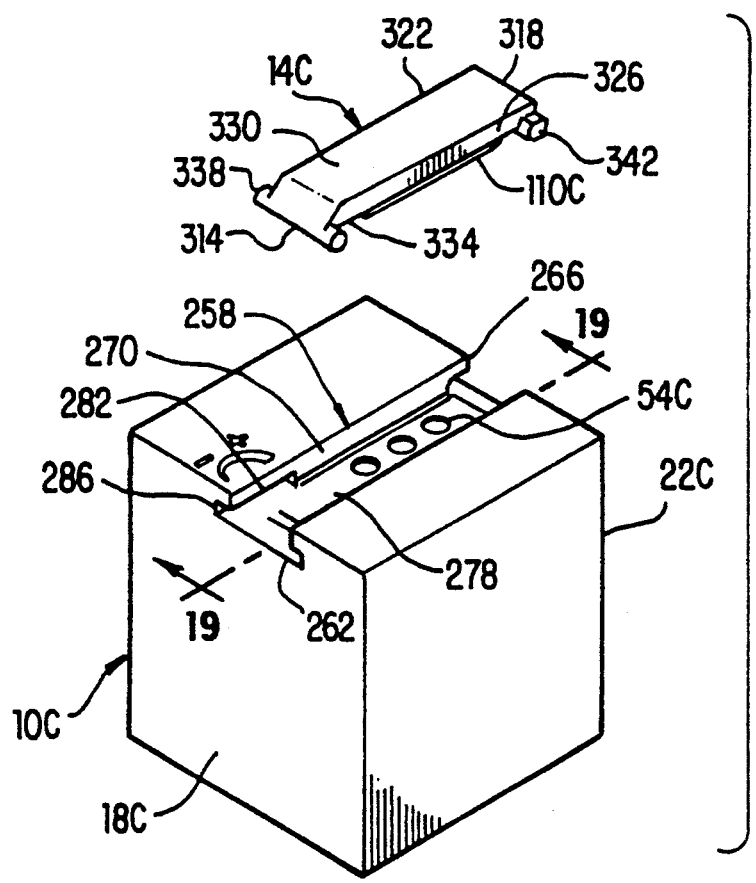
FIG. 17 is an isometric view of a third embodiment of the invention showing the first side of the enclosure with the door removed and above the enclosure.
Figure 18:
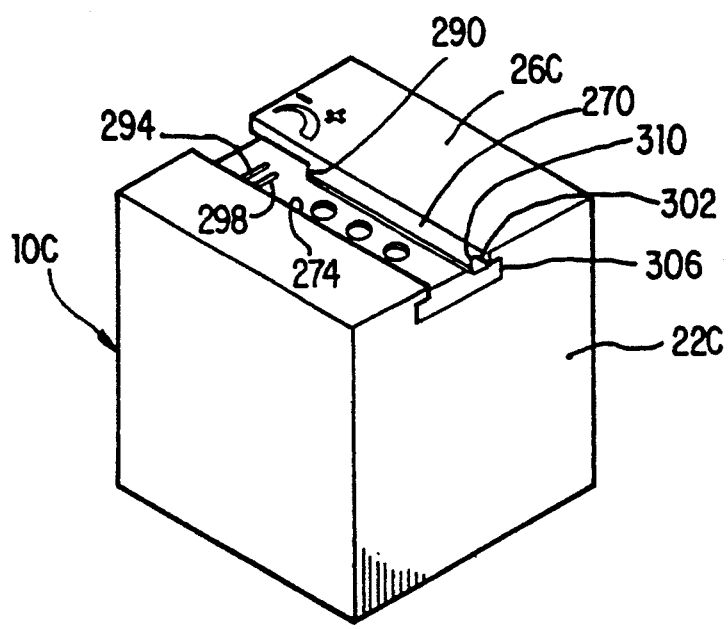
FIG. 18 is an isometric view of the third embodiment showing the second side of the enclosure without the door.

In FIG. 17, the access door 14C is generally rectangular in shape and includes a hinging end 314, a latching end 318, a hinging side 322, a second side 326, a top 330, and a bottom 334. A compressible sealing means 110C may be fixedly attached to the bottom 334 of the door 14C by any suitable means. At the hinging end 314 of the door 14C is a hinge pin 338, generally cylindrical in shape and an integral part of the door 14C. The hinge pin 338 extends outwardly from and perpendicularly to each of the first and second sides 322 and 326, respectively, of the door 14C. At the second end 318 of the door 14C a locking ear 342 extends outwardly from and perpendicular to each of the first and second sides 322 and 326, respectively. Each locking ear 342 has a first end 346, generally semicircular in cross-section, and a second end 350, generally flat and in the same plane as the latching end 318 of the door 14C.

Figure 19:
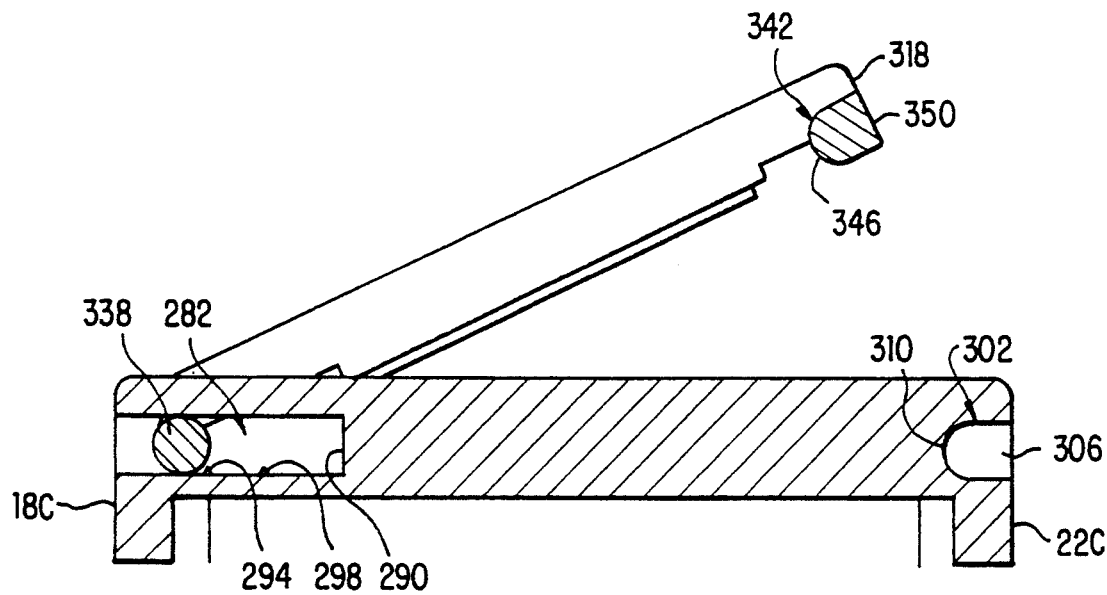
FIG. 19 is a cross-sectional view taken along line 19—19 of FIG. 17 showing the door hinge pins being initially installed in the hinge pin retaining slots.

To attach the door 14C to the enclosure 10C, the extending ends of the hinge pin 338 must be slidably inserted into the first ends 286 of the hinge pin slots 282, as shown in FIG. 19. The hinge pin 338 must then be urged past the first retaining ridge 294. At this point the door 14C is held captive to the enclosure 10C by the first retaining ridge 294 and the hinge pin 338 in the hinge pin slots 282.

Figure 20:
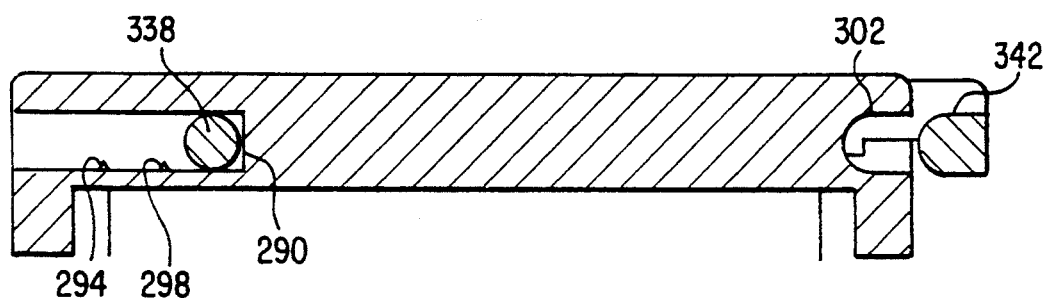
FIG. 20 is a cross-sectional view taken along line 19—19 of FIG. 17 showing the door hinge pins fully inserted into the hinge pin retaining slot prior to latching the door in the closed position.
Figure 21:
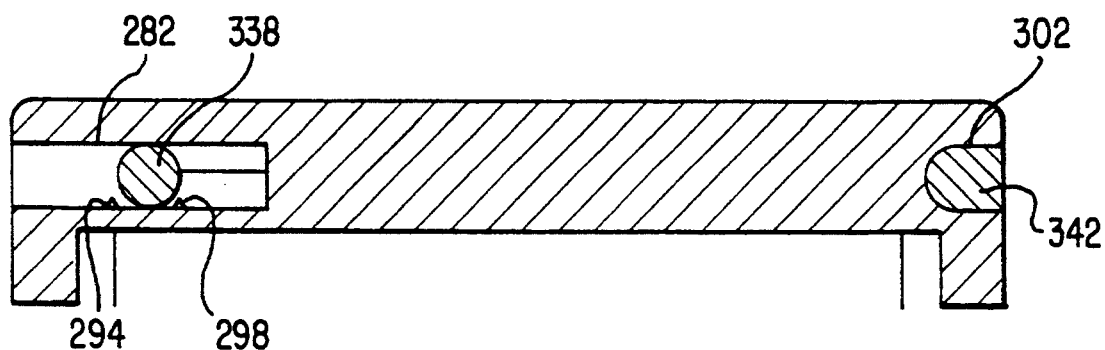
FIG. 21 is a cross-sectional view taken along line 19—19 of FIG. 17 showing the door in the latched position.

To close the door 14C and seal the access hole 54C the hinge pin 338 must be further urged past the second retaining ridge 298 towards the second end 290 of the hinge pin slot 282. In this position the first ends 346 of the locking ears 342 are sufficiently past the second side 22C of the enclosure 10C to permit the door 14C to be fully rotated to the closed position as shown in FIG. 17. By slidably urging the door 14C inward the first ends 346 of the locking ears 342 will be received within the first ends 306 of the locking grooves 302. As the door 14C is urged further inward the second ends 350 of the locking ears 342 will coincide with the second side 22C of the enclosure, and the hinge pin 338 will again move past the second retaining ridge 298 thereby holding the door 14C in the closed position as shown in FIG. 20.

To open the access door 14C, it must be slidably moved towards the second side 22C of the enclosure 10C until the hinge pin 338 passes over the second retaining ridge 298 and touches the second end 290 of the hinge pin slot 282. At this point the first ends 346 of the locking ears 342 will be clear of the second side 22C of the enclosure 10C permitting the door 14C to be rotated about the hinge pin 338 to the open position.

We claim:

1. An enclosure for housing adjustable electrical components, having a sealable access means, the improvement comprising:

a. said enclosure being generally hollow and having a generally flat top, a first side generally perpendicular to said top, and a second side generally parallel to said first side and spaced apart by said top;

b. a door hingedly attached and removable from said enclosure, generally rectangular in shape, having two parallel spaced apart sides, a hinging end, a latching end spaced apart from said hinging end, a top, a bottom, a hinge pin integrally formed from said hinging end, said hinge pin having a pair of outwardly extending portions perpendicular to each of said two parallel sides, said hinged door movable between a closed position and an open position;

c. an access well receiving said hinged door, said well extending generally between said first and second spaced apart sides of said enclosure said well having a bottom surface being generally flat and parallel to said enclosure top and spaced apart from said enclosure top by a pair of side walls, said bottom surface having at least one access opening passing there through for providing access to the adjustable components contained within said enclosure, said side walls being generally parallel to one another and spaced apart by said well bottom surface, said side walls of said well each having a retaining groove, integrally formed in said side walls and extending inward from said second side of said enclosure, said grooves slidably receiving said outwardly extending portions of said hinge pin so that said outwardly extending portions do not slide outwardly towards and through said second side when said door is being removed;

d. means for selectively retaining said hinge pin in said grooves such that said door is hingably attached to said enclosure without welding and is selectively installed and removed from said enclosure;

e. means for latching said door securely in the closed position within said access well with the top of said door generally flush with the top of said enclosure; and f. means mounted to the bottom of said door for sealing said access opening.

2. The device of claim 1 wherein said hinge pin is generally cylindrical in shape having a full circular diameter and each said extending portion including a flat chordal surface along its length, said chordal surface reducing the cross-sectional dimension of said full circular diameter.

3. The device of claim 2 wherein each of said integrally formed retaining grooves is generally L-shaped and includes a first and a second leg, said legs being perpendicular to one another and connected at a common end, said L-shaped grooves are disposed in said side walls such that an open side of one L-shaped groove faces an open side of the other L-shaped groove, said first leg of each said L-shaped groove has a distal end coincident with the top of the enclosure for receiving said extended portion of said hinge pin.

4. The device of claim 3 wherein the width of said first leg of said integrally formed L-shaped retaining groove is sized to selectively and slidably receive only said reduced cross sectional dimension of said extended portion of said hinge pin.

5. The device of claim 4 wherein said second leg of said L-shaped retaining groove is sized to slidably receive said full circular diameter of said hinge pin such that said door may rotate on said hinge pin from a fully closed position to a fully open position.

6. The device of claim 5 wherein said chordal surface is selectively positioned on said extended portion of said hinge pin such that said door can not be removed from the enclosure when said door is in the fully open position.

7. The device of claim 1 wherein said sealing means is fixedly attached to said bottom of said door.

8. The device of claim 1 wherein said means for latching includes:
   a. a hook extending upwardly from and perpendicular to the bottom of said well defining an L-shaped protrusion, generally rectangular in shape; and
   b. a latching member, generally L-shaped in cross-section and having a first leg integrally attached to said latching end of said door by a flexible bridge formed from a portion of said door top, said first leg extending downward from and generally perpendicular to said bridge terminating at a distal end, and a second leg integrally connected to said first leg at said distal end, said second leg extending outward from and generally perpendicular to said first leg, said second leg being slidably received over said protrusion at one end of said well when the hinged door is closed.

9. The device of claim 7 wherein said latching means includes a portion of said door, the door being in a latched engagement and generally in the same plane as the enclosure top in the closed position and the latching means providing sufficient force to compress the sealing means firmly between said bottom of said door and said bottom of said well for the purpose of sealing said access opening from contaminant ingress.

10. The device of claim 1 wherein said means for selectively retaining said hinge pins in said groove comprises:
    a retaining ridge, protruding upward from said bottom of said well and extending between and generally perpendicularly to said sides of said well, said retaining ridge being adjacent to said second side of said enclosure such that said hinge pin when slidingly pushed into said grooves and over said retaining ridge is captivated in said grooves by said retaining ridge.

11. The device of claim 1 wherein said means for latching further comprises:
    a. a hook, extending upwardly from said bottom of said well and running generally between and perpendicularly to said sides of said well;
    b. a latch, extending downwardly from said top of said door and being integrally attached to said latching end of said door such that said latch is flexible with respect to said door, said latch having a barb which engages said latch hook when said top of said door is flush with said top of said enclosure for retaining said door in a closed position; and
    c. means for releasing said latch from said latch hook.

12. The device of claim 11 wherein said means for releasing said latch from said hook further comprises:
    a portion of said latch defining a slot for receiving a tool to pry the hook and latch apart.

13. The device of claim 1 wherein said sealing means is attached to said bottom of said door.

14. The device of claim 1 wherein said means for selectively retaining said hinge pins in said groove comprises:
    a retaining ridge, protruding upward from said bottom of said well and extending between and generally perpendicularly to said sides of said well, said retaining ridge being adjacent to said first side of said enclosure such that said hinge pin when slidingly pushed into said grooves and over said retaining ridge is captivated in said grooves by said retaining ridge.

15. The device of claim 14 wherein said means for latching further comprises:
    a. a pair of locking ears, each extending outwardly from and generally perpendicular to one of said two parallel sides of said door at said latching end;
    b. a locking groove, integrally formed in each of said side walls of said slot and extending inward from said second side of said enclosure, said locking grooves slidably receive said locking ears of said door when said top of said door is flush with said top of said enclosure; and
    c. a locking ridge protruding upward from said bottom of said slot and extending between and generally perpendicularly to said sides of said slot, said locking ridge being generally parallel to and spaced apart from said retaining ridge such that said hinge pin lies between said locking ridge and said retaining ridge when said door is in the latched position.

* * * * *